US007768527B2

(12) United States Patent
Zhang et al.

(10) Patent No.: US 7,768,527 B2
(45) Date of Patent: Aug. 3, 2010

(54) HARDWARE-IN-THE-LOOP SIMULATION SYSTEM AND METHOD FOR COMPUTER VISION

(75) Inventors: Guangjun Zhang, Beijing (CN); Suqi Li, Beijing (CN); Zhenzhong Wei, Beijing (CN); Zhen Liu, Beijing (CN)

(73) Assignee: Beihang University, Beijing (CN)

( * ) Notice: Subject to any disclaimer, the term of this patent is extended or adjusted under 35 U.S.C. 154(b) by 327 days.

(21) Appl. No.: 11/561,696

(22) Filed: Nov. 20, 2006

(65) Prior Publication Data

US 2008/0050042 A1    Feb. 28, 2008

(30) Foreign Application Priority Data

May 31, 2006   (CN) .................... 2006 1 0083637
May 31, 2006   (CN) .................... 2006 1 0083639

(51) Int. Cl.
*G09G 5/00*    (2006.01)
*G03B 21/26*   (2006.01)

(52) U.S. Cl. .................... 345/619; 345/632; 352/67; 352/90; 353/28

(58) Field of Classification Search ............... 345/632; 352/67, 90
See application file for complete search history.

(56) References Cited

U.S. PATENT DOCUMENTS

| | | | | |
|---|---|---|---|---|
| 5,235,363 A | * | 8/1993 | Vogeley et al. | 353/122 |
| 5,426,732 A | * | 6/1995 | Boies et al. | 715/839 |
| 5,528,263 A | * | 6/1996 | Platzker et al. | 345/156 |
| 5,613,048 A | * | 3/1997 | Chen et al. | 345/419 |
| 5,717,414 A | * | 2/1998 | Bergsneider et al. | 345/8 |
| 5,850,352 A | * | 12/1998 | Moezzi et al. | 345/419 |
| 5,969,754 A | * | 10/1999 | Zeman | 348/136 |
| 6,084,797 A | * | 7/2000 | Maloberti et al. | 365/189.15 |
| 6,166,744 A | * | 12/2000 | Jaszlics et al. | 345/629 |
| 6,364,490 B1 | * | 4/2002 | Krause | 353/77 |
| 6,414,672 B2 | * | 7/2002 | Rekimoto et al. | 345/173 |
| 6,431,711 B1 | * | 8/2002 | Pinhanez | 353/69 |
| 6,437,823 B1 | * | 8/2002 | Zhang | 348/187 |
| 6,753,900 B2 | * | 6/2004 | Runcie et al. | 348/14.16 |
| 6,802,611 B2 | * | 10/2004 | Chu et al. | 353/28 |
| 6,842,175 B1 | * | 1/2005 | Schmalstieg et al. | 345/427 |
| 6,956,503 B2 | * | 10/2005 | Yokokohji et al. | 340/988 |
| 6,993,206 B2 | * | 1/2006 | Ishino et al. | 382/291 |
| 7,176,881 B2 | * | 2/2007 | Nishimura et al. | 345/156 |
| 7,242,818 B2 | * | 7/2007 | Beardsley et al. | 382/291 |

(Continued)

OTHER PUBLICATIONS

Balcisoy et al., Augmented Reality for Real and Virtual Humans, 2000, IEEE, pp. 1-5.*

(Continued)

*Primary Examiner*—M Good Johnson
(74) *Attorney, Agent, or Firm*—Workman Nydegger (57) ABSTRACT

The disclosure relates to a hardware-in-the-loop simulation system and method for computer vision. An embodiment of the disclosed system comprises a software simulation and a hardware simulation. The software simulation includes a virtual scene and an observed object that are generated by virtual reality software. The virtual scene images are obtained at different viewpoints. The hardware simulation includes the virtual scene images being projected onto a screen by a projector, wherein the projected scene images are shot by a camera, and where in the direction of the camera is controlled by a pan-tilt.

6 Claims, 7 Drawing Sheets

U.S. PATENT DOCUMENTS

| | | | | |
|---|---|---|---|---|
| 7,407,297 B2* | 8/2008 | Rivera | 353/121 |
| 7,410,260 B2* | 8/2008 | Mehrl | 353/28 |
| 7,423,553 B2* | 9/2008 | Yokokohji et al. | 340/937 |
| 7,427,983 B1* | 9/2008 | Hildebrandt et al. | 345/175 |
| 7,436,429 B2* | 10/2008 | Tillotson | 348/36 |
| 7,522,186 B2* | 4/2009 | Arpa et al. | 348/153 |
| 7,538,774 B2* | 5/2009 | Kunita et al. | 345/589 |
| 7,576,727 B2* | 8/2009 | Bell | 345/158 |
| 2001/0012001 A1* | 8/2001 | Rekimoto et al. | 345/173 |
| 2002/0105623 A1* | 8/2002 | Pinhanez | 353/69 |
| 2002/0158873 A1* | 10/2002 | Williamson | 345/427 |
| 2005/0128196 A1* | 6/2005 | Popescu et al. | 345/420 |
| 2005/0128437 A1* | 6/2005 | Pingali et al. | 353/69 |
| 2006/0044546 A1* | 3/2006 | Lewin et al. | 356/4.04 |

OTHER PUBLICATIONS

Balcisoy et al., Interaction between Real and Virtual Humans, 1997, IEEE Computer Animation, pp. 31-38.*

Torre et al., Interaction Between Real and Virtual Humans: Playing Checkers, 2000, IEEE, pp. 1-10.*

Dannenmann et al., An INtegrated VR and Simulation Environment for Supporting the Complete Product Life Cycle of Space-Related Systems, IEEE, 1997, pp. 1-10.*

Sun et al., Panoramic video capturing and compressed domain virtual camera control, 2001, pp. 329-347, ACM.*

Torre et al., Interaction between real and virtual humans: playing checkers, 2000, pp. 1-10, Eurogrpahics Workshop on Virtual Environments.*

Pinhanez et al., Projector-camera systems for telepresence, pp. 63-66, ACM 2004.*

* cited by examiner

HARDWARE-IN-THE-LOOP SIMULATION SYSTEM AND METHOD FOR COMPUTER VISION

CROSS-REFERENCE TO RELATED APPLICATIONS

This application claims priority from Chinese Patent Application Serial Nos. 200610083637.7 filed May 31, 2006 and 200610083639.6 filed May 31, 2006, the disclosures of which, including their specifications, drawings and claims, are incorporated herein by reference in their entirety.

TECHNICAL FIELD

The present disclosure relates to a hardware-in-the-loop simulation for computer vision. In particular, the disclosure relates to a system and method for performing a hardware-in-the-loop simulation. The system integrates an actual camera into virtual reality (VR) simulation environment to provide a hardware-in-the-loop simulation platform for the development and verification of a computer vision algorithm or method.

BACKGROUND

As a new interdisciplinary field, computer vision has made great progress in both theoretical research and practical application. Especially, following the development of image processing technology and computers with high performance in recent years, computer vision has been applied in many practical applications, such as target identification, surveying and mapping, industrial measurement, industrial control, automatic navigation and military application, etc.

The simulation of camera imaging can provide a convenient and quick experiment platform for the study of computer vision to get simulation data under various conditions, which saves money and shortens the time for study. Therefore, it is significant in the process of the study of the computer vision. Especially, when the actual operating conditions are special, the simulation system becomes more important, such as aerial mapping which is to get realtime 3D terrain data but where a computer vision algorithm cannot be carried under the actual flight environments based on cost or time constraints.

At present, the simulations of computer vision are almost digital simulations. Although complete software simulations could reduce the cost and time of study and experimentation to a minimum level, it is difficult to establish mathematical models for complex computer vision systems. The complex systems have to be simplified for complete software simulations, so disparities exist between the conditions of the complete digital simulation and the actual working condition because of excessive idealization. Especially when the camera exhibits lens distortion and stronger noises interfere, the truthfulness and reliability of images acquired by complete digital simulation become bad. Hardware-in-the-loop simulations can overcome above insufficiency. Hardware-in-the-loop simulation systems replace the mathematical model of the performance hardware with the hardware itself in order to approach the actual condition for a more accurate simulation result. These hardware-in-the-loop systems are economical means of computer vision study and experiment under various conditions, such as the utilization to testify the correctness and evaluate the performance of computer vision algorithm in the initial stage of study.

The hardware-in-the-loop simulation system has to integrate software with hardware. It is rather difficult to establish the system model between software and hardware to determine the relationship between the virtual reality scene and the real-life camera image, so it is a bottleneck of computer vision hardware-in-the-loop simulation. There is no hardware-in-the-loop simulation system or method to solve the above problem for computer vision mentioned in the existing literatures at present. So it is necessary and urgent to solve the bottleneck problem and set up a practical and efficient hardware-in-the-loop simulation system for computer vision.

SUMMARY

The present disclosure is directed to solving the above described problem and provides a hardware-in-the-loop simulation system and method for computer vision. It integrates actual camera into VR simulation environment, to construct the sensor structure integrated hardware and software for hardware-in-the-loop simulation according to cascade projection transformations. It possesses the advantages of high accuracy, simple structure and low cost.

One embodiment of the disclosed hardware-in-the-loop simulation system presented herein comprises a VR imaging unit, a projection unit and an actual camera unit. The three units are sequential and their positions are fixed with respect to each other. The VR imaging unit builds up desired objects or scenes corresponding to the actual environment and project rendered objects or scenes onto the display as a virtual camera by using the VR technology, e.g. OpenGL. The projection unit projects the virtual scene image, i.e. virtual camera image, on the computer display onto the projection screen by a projector. The actual camera unit acquires the image of scene on the projection screen taken by an off-the-shelf camera.

Based on the above-described apparatus it is possible to achieve a hardware-in-the-loop simulation according to the following method. Firstly set up virtual objects or scenes by using the VR software, set imaging parameters to acquire the 3D image of the virtual scene in desired direction. Then project the computer virtual scene image onto the screen by projector. Lastly, acquire an output image by shooting the scene image on the screen with actual camera. The camera image is the result of the simulation as a computer vision experiment object. Before the experiment data processing and analysis the parameters of virtual camera should be calculated, the actual camera and projector models should be calibrated for the parameters estimation. Comparing the computer vision arithmetic experiment result based on the simulation images and the parameters of system with the known character data of the virtual objects, it can be testified the correctness and evaluate the performance of the algorithm.

The present disclosure builds a hardware-in-the-loop simulation platform which integrates software with hardware and has the following advantages. First, VR technology is integrated with computer vision technology creatively and effectively. The system not only has the advantages of easier realization and convenient operation as software simulation, but also has the advantage of high similarity to the actual experiment conditions as hardware simulation. It fills the gap of the hardware-in-the-loop simulation technology for computer vision. Second, the structure of system is simple and cost is low, because main parts of the system are a common projector, and off-the-shelf camera and computers. It is easily achieved and fits a wide variety of applications in the computer vision field, so the system is worth to be popularized. Finally, the precision of system is rather high to ensure the validity of simulation. The result of stereo vision 3D reconstruction simulation indicates that the measure precision of 3D reconstruction based on the hardware-in-the-loop simulation system can reach 1%.

Other objects and features of the present invention will become more readily apparent from the following detailed description of the preferred embodiment taken in conjunction with the accompanying drawings.

BRIEF DESCRIPTION OF THE DRAWINGS

The accompanying drawings, which are incorporated in and constitute a part of specification, illustrate an exemplary embodiment of the present invention and, together with the general description given above and the detailed description of the preferred embodiment given below, serve to explain the principles of the present invention.

DETAILED DESCRIPTION

While the claims are not limited to the illustrated embodiments, an appreciation of various aspects of the present invention is best gained through a discussion of various examples thereof. Referring now to the drawings, illustrative embodiments will be described in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description.

Figure 1:
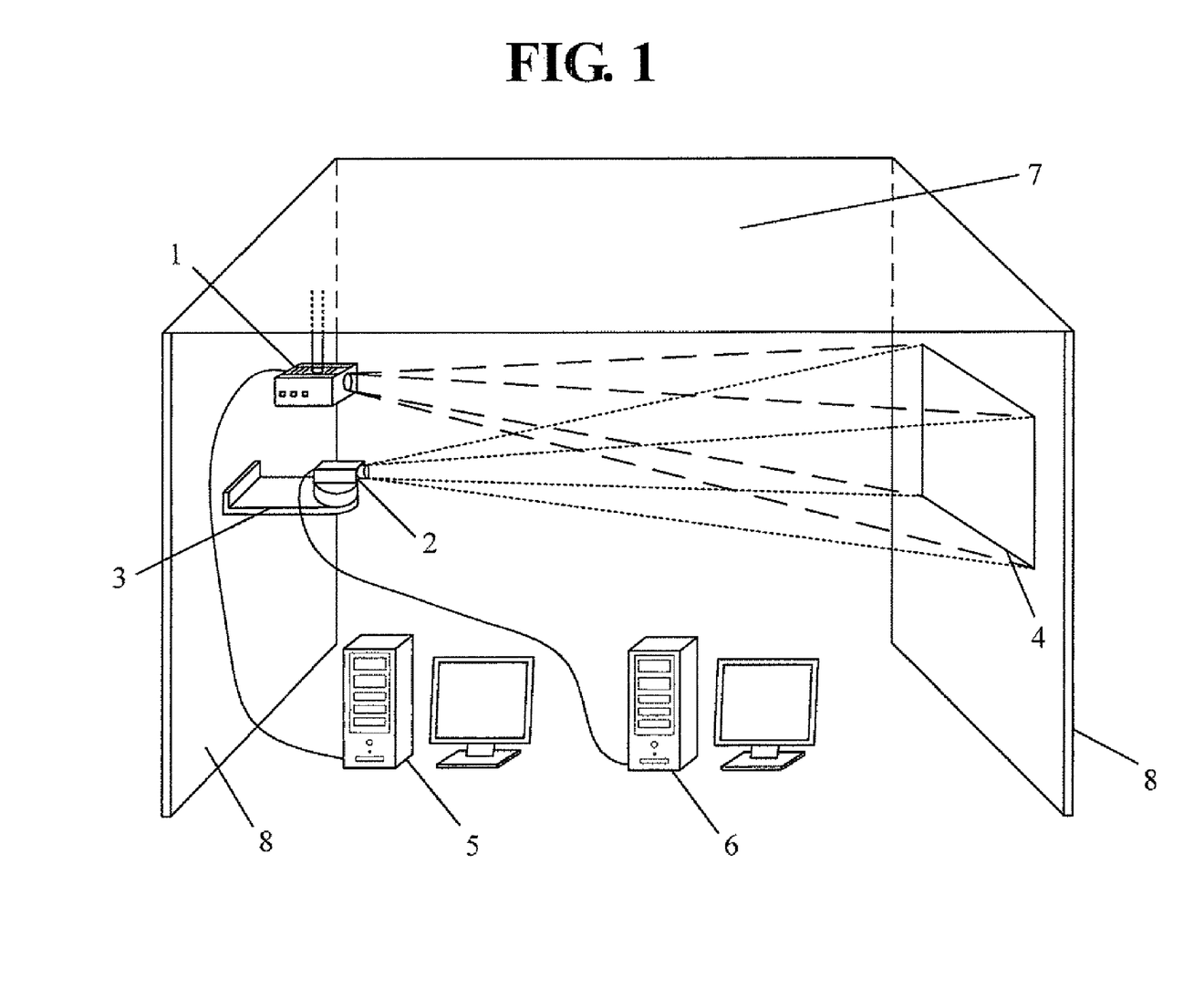
FIG. 1 illustrates a hardware configuration of a hardware-in-the-loop simulation system according to an embodiment of the present invention.

The system is used for a hardware-in-the-loop simulation of stereo vision. First, a description will be given below of a configuration of a hardware-in-the-loop simulation system of computer vision. FIG. 1 illustrates the hardware configuration of the hardware-in-the-loop simulation system. The system comprises a projector 1, a camera 2, a pan-tilt 3 for camera 2, a projection screen 4, and computers 5 and 6. The projector 1 is fixed upon a ceiling 7 such as, for example, with a hanger. The pan-tilt 3 and projection screen 4 are fixed to the wall by steady brackets or on the wall 8 directly. The projector 1 may be a common off-the-shelf product and is configured to communicate with the computer 5 in which virtual reality, hereinafter "VR", software is installed for generating virtual 3D scene images. The virtual scene image is projected onto the screen 4. The camera 2 may be an off-the-shelf CCD camera which is fixed on the pan-tilt 3. The camera 2 is configured to communicate with the computer 6 with a frame grabber board. The computer 6 is also used to control the pan-tilt 3 for a suitable direction of camera to select a proper "FOV" (field of view) of camera 2. After positioning of camera 2 is determined, the pan-tilt 3 should not rotate any more during the use of the system. The principle of selecting lens of camera 2 is that the size of FOV of camera 2 is as same as possible as the size of image on the projection screen 4 and not larger than the image's. The parameters of the system should be calculated and calibrated for application of the simulation system, for example, the camera 2 should be calibrated in the computer vision. While the system is in the parameters calibration or work state, the positions and parameters of the projector 1, the camera 2, the pan-tilt 3 and the screen 4 must be fixed for high precision of simulation.

Figure 2:
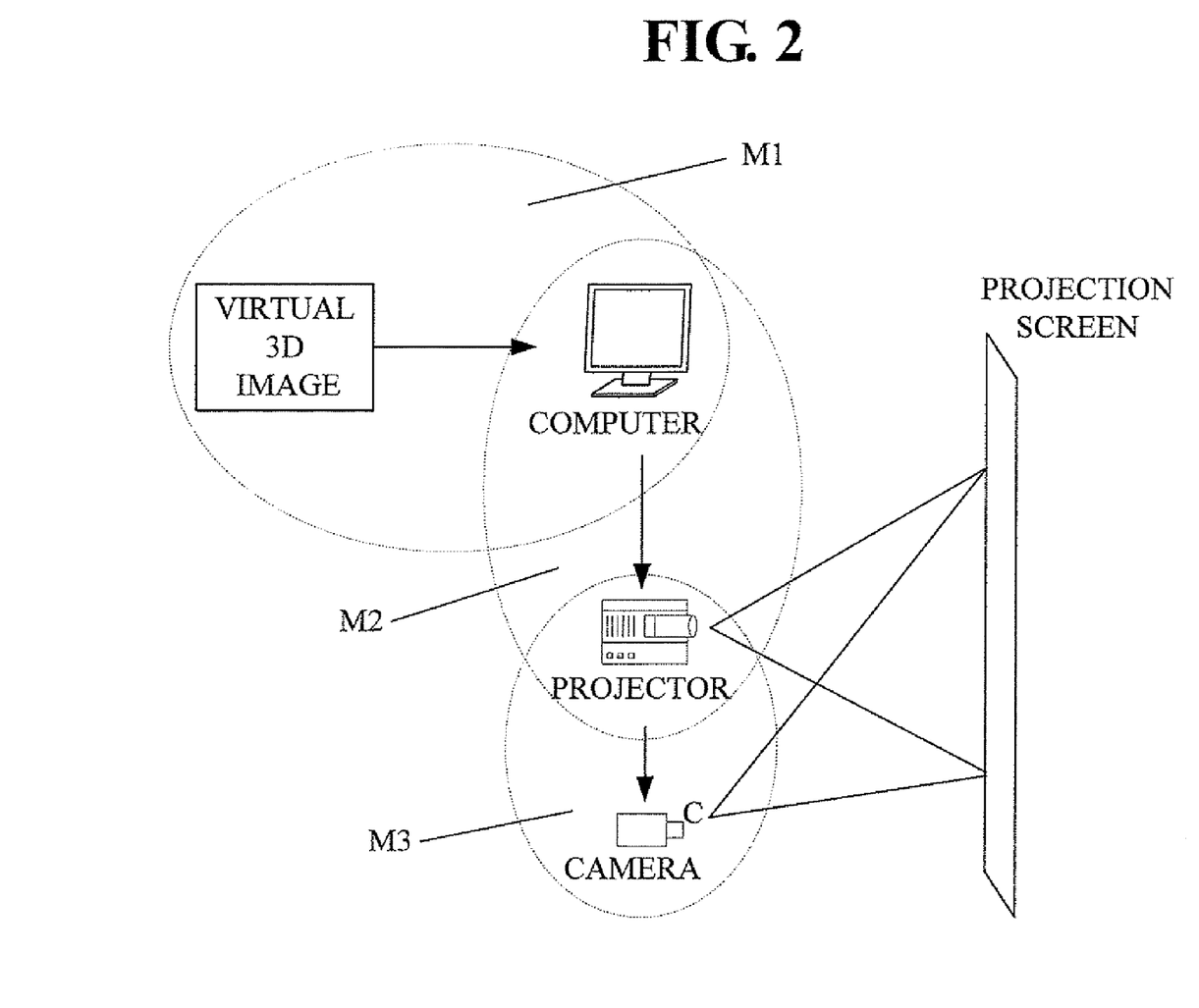
FIG. 2 illustrates three projection transformation models of a hardware-in-the-loop simulation system for computer vision.

Referring to FIG. 2, in one embodiment, the system is comprised of three projection transformation models. These models include virtual camera model M1, projector imaging model M2 and camera model M3. The three models are operatively connected with each other in series, so that the output of one model is the input of another. The virtual camera model M1 is realized by VR software such as, for example, OpenGL. The virtual camera images under various conditions are acquired through setting corresponding parameters. The virtual camera model is a linear transformation, and the parameters of virtual camera can be calculated according to the function parameters of VR software. The projector imaging model M2 and the camera model M3 are realized by actual apparatuses; they are nonlinear plane-to-plane projection transformations. The hardware parts of the hardware-in-loop simulation system should be calibrated.

Figure 3:
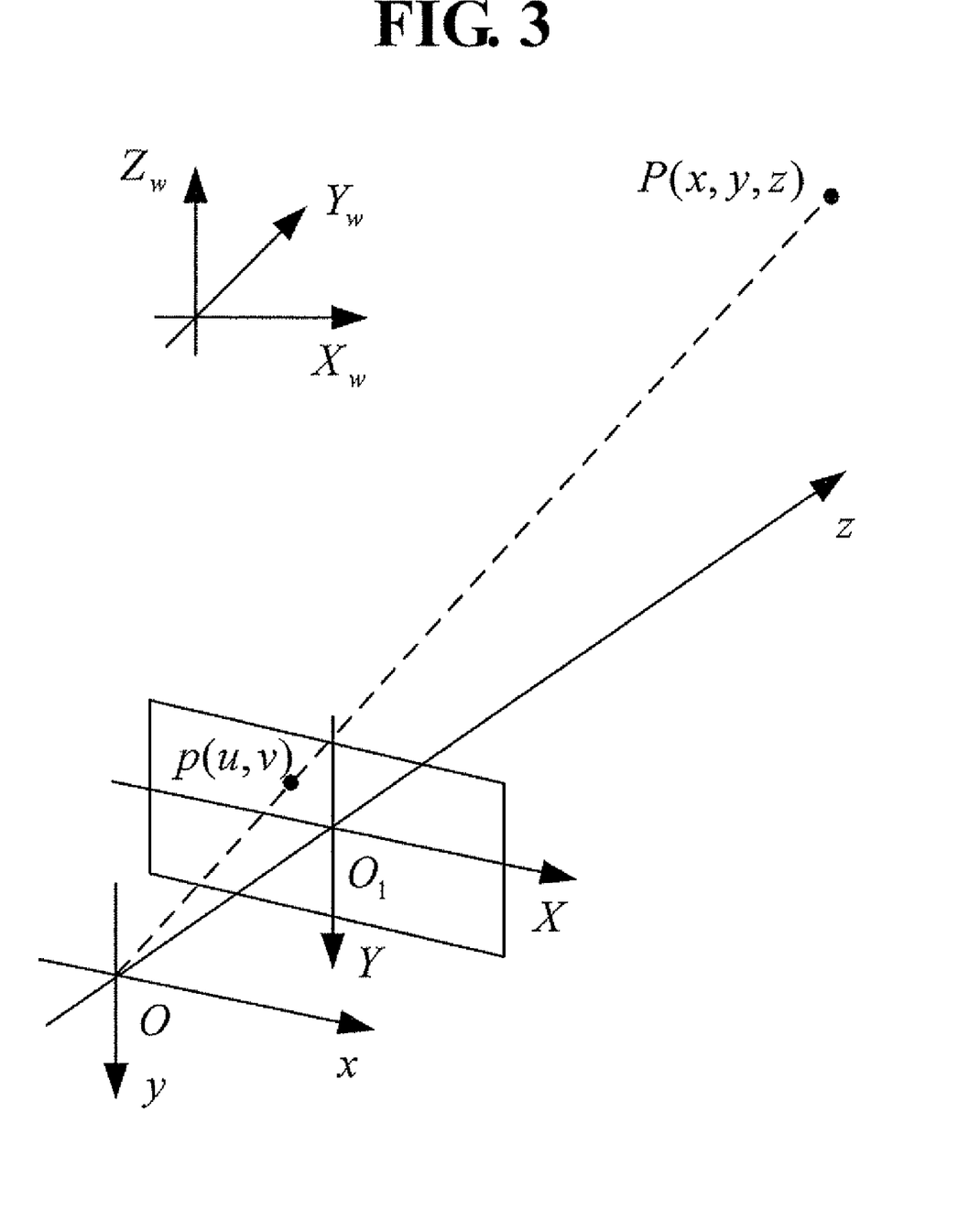
FIG. 3 illustrates an embodiment of a linear pinhole camera model with a camera coordinate system and a world coordinate system.

In this embodiment, the pinhole camera model that most algorithms of computer vision usually are based on is used. The virtual camera model is an ideal linear pinhole camera model. Referring to FIG. 3, the linear transformation from the world coordinate to the camera coordinate is described by the following equation,

[Equation 1]

$$s_v \begin{bmatrix} u_v \\ v_v \\ 1 \end{bmatrix} = \begin{bmatrix} \alpha_{vx} & 0 & u_{v0} & 0 \\ 0 & \alpha_{vy} & v_{v0} & 0 \\ 0 & 0 & 1 & 0 \end{bmatrix} \begin{bmatrix} R_v & T_v \\ 0^T & 1 \end{bmatrix} \begin{bmatrix} X_{vw} \\ Y_{vw} \\ Z_{vw} \\ 1 \end{bmatrix} = \quad (1)$$

$$M_{1v} M_{2v} \begin{bmatrix} X_{vw} \\ Y_{vw} \\ Z_{vw} \\ 1 \end{bmatrix} = M_v \begin{bmatrix} X_{vw} \\ Y_{vw} \\ Z_{vw} \\ 1 \end{bmatrix}$$

Where $(X_{vw}, Y_{vw}, Z_{vw}, 1)^T$ is the 3D world homogeneous coordinate with the subscript v indicating the virtual camera model, $(u_v, v_v, 1)^T$ is the computer image homogeneous coordinate, $\alpha_{vx}=f_v/dx_v$ and $\alpha_{vy}=f_v/dy_v$ are the scale factors in the direction of X and Y axes of the virtual camera image, $f_v$ is effective focal length of virtual camera, $dx_v$ and $dy_v$ are the distance between adjacent sensor elements in X and Y directions respectively, $(u_{v0}, v_{v0})$ is the coordinate of the principal point, $s_v$ is an arbitrary scale factor, $R_v$ and $T_v$ are the 3×3 rotation matrix and translation vector which relate the world coordinate system to the camera coordinate system. $M_{1v}$ is called the camera intrinsic matrix is determined by the intrinsic parameters $\alpha_{vx}, \alpha_{vy}, u_{v0}$ and $v_{v0}$, and $M_{2v}$ is called the camera extrinsic matrix is determined by the extrinsic parameters $R_v$ and $T_v$. $M_v$ is called the projection matrix of which the elements can be acquired according to the parameters of VR software.

Like the virtual camera model, the projector imaging model is described by the following equation.

[Equation 2]

$$s_p \begin{bmatrix} u_p \\ v_p \\ 1 \end{bmatrix} = \begin{bmatrix} \alpha_{px} & 0 & u_{p0} & 0 \\ 0 & \alpha_{py} & v_{p0} & 0 \\ 0 & 0 & 1 & 0 \end{bmatrix} \begin{bmatrix} R_p & T_p \\ 0^T & 1 \end{bmatrix} \begin{bmatrix} X_{pw} \\ Y_{pw} \\ Z_{pw} \\ 1 \end{bmatrix} = M_p \begin{bmatrix} X_{pw} \\ Y_{pw} \\ Z_{pw} \\ 1 \end{bmatrix} \quad (2)$$

The definitions of the parameters in the above equation (2) are the same as those in equation (1) with the subscript p indicating the projector imaging model. Without loss of generality, it can be assumed that $Z_{pw}=0$ because of the plane-to-plane projection transformation. So from equation (2), we have:

[Equation 3]

$$s_p m_p = \begin{bmatrix} \alpha_{px} & 0 & u_{p0} \\ 0 & \alpha_{py} & v_{p0} \\ 0 & 0 & 1 \end{bmatrix} \begin{bmatrix} r_{1p} & r_{2p} & T_p \end{bmatrix} \begin{bmatrix} X_{pw} \\ Y_{pw} \\ 1 \end{bmatrix} \quad (3)$$

$$= H_p \tilde{X}_{pw}$$

Where $m_p = [u_p\ v_p\ 1]^T$, $r_{1p}$, $r_{2p}$ are the first and second columns of $R_p$, $\tilde{X}_{pw} = [X_{pw}\ Y_{pw}\ 1]^T$.

Likewise, the equation of the actual camera model can be deduced through the same process as the projector imaging model. It is described by the following equation.

[Equation 4]

$$s_c \begin{bmatrix} u_c \\ v_c \\ 1 \end{bmatrix} = s_c m = \begin{bmatrix} \alpha_{cx} & 0 & u_{c0} \\ 0 & \alpha_{cy} & v_{c0} \\ 0 & 0 & 1 \end{bmatrix} \begin{bmatrix} r_{1c} & r_{2c} & T_c \end{bmatrix} \begin{bmatrix} X_{cw} \\ Y_{cw} \\ 1 \end{bmatrix} = H_c \tilde{X}_{cw} \quad (4)$$

The definitions of the parameters in the above equation (4) are the same as those in the equation (3) with the subscript c indicating the camera model.

The lens distortions of the camera and projector are not considered in equations (3) and (4). But a real-life camera usually exhibits lens distortion. So a nonlinear camera calibration technique should be adopted to calibrate the parameters or hardware part of the system, and the process of the calibration will be expounded in detail in the following section.

Figure 4:
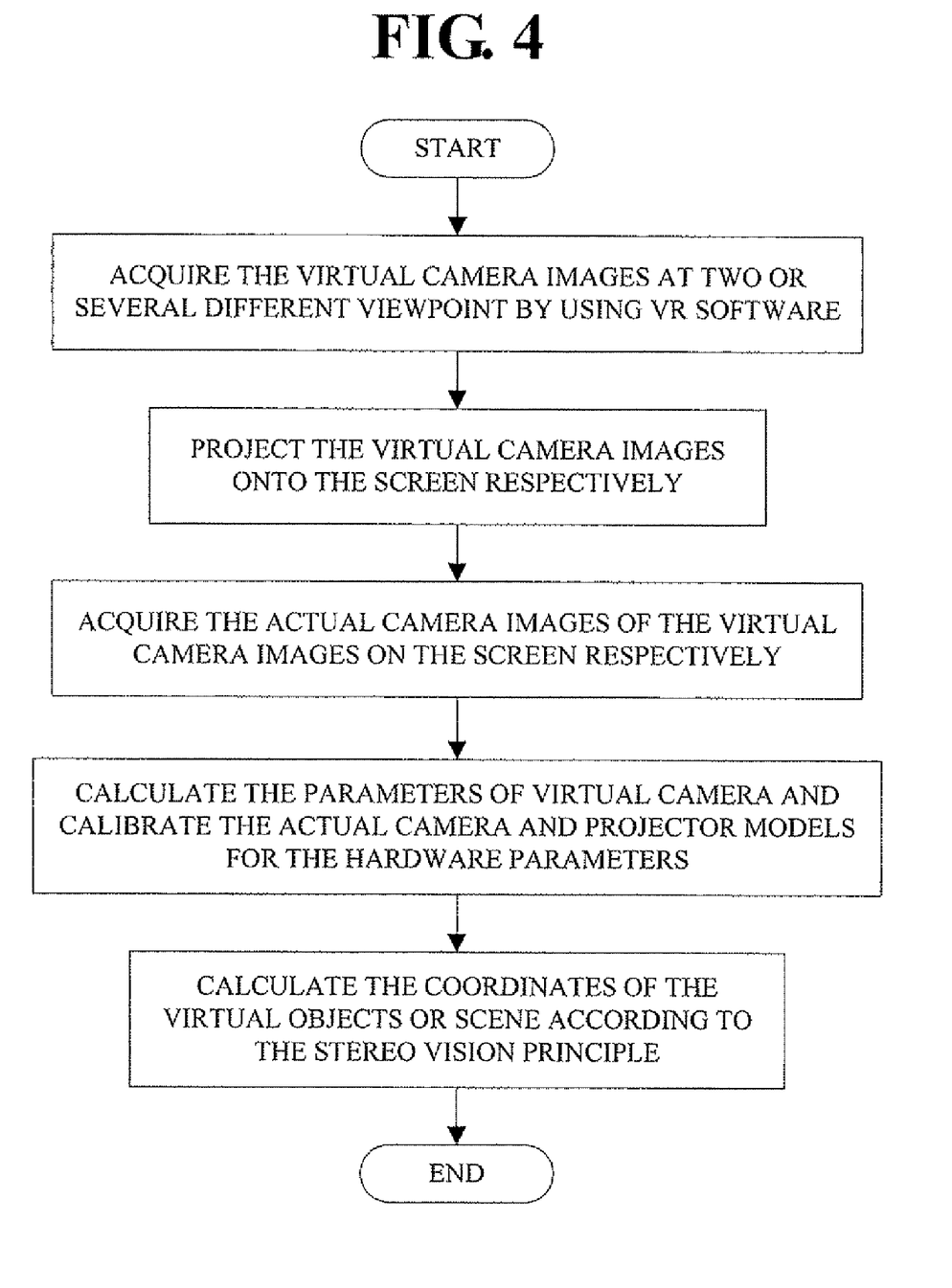
FIG. 4 is a flowchart of a stereo vision simulation processing using the hardware-in-the-loop simulation system in accordance with an embodiment of the present invention.

Referring to FIG. 4, in one embodiment, there are five steps to achieve the stereo vision hardware-in-the-loop simulation. First, the virtual object or scene is generated by VR software and the virtual scene images are acquired at two or several different viewpoints by setting the following parameters, the vertical FOV angle in degree θ, the aspect ratio of the width to height of the viewport (computer screen) Aspect, the distance from viewpoint to near and far clipping planes NearPlane and FarPlane, the position of viewpoint i.e. the 3D coordinates in the world coordinate system XPos, YPos, ZPos, and the yaw, pitch and roll angles $\theta_{Yaw}$, $\theta_{Pitch}$, $\theta_{Roll}$. Second, the virtual scene images are projected onto the screen 4, respectively, by the projector 1. Third, the virtual 3D scene images of different viewpoints are respectively shot using the actual camera 2 to acquire the output images of the simulation system. Fourth, the parameters of virtual camera are calculated, and the actual camera and projector models are calibrated for high-accuracy parameters estimation. Fifth, the coordinates of virtual objects or scenes in the world coordinate system are obtained by using basic principle and correlative arithmetic of the stereo vision according to the camera images to confirm the correctness and evaluate the performance of the stereo vision algorithm.

The third and fourth steps in the FIG. 4 are the most important for simulation, because the correctness of simulation result depends on the validity of the parameters of the system that are calculated and calibrated. The process how to acquire the parameters of system is described in detail in the following text.

Figure 5:
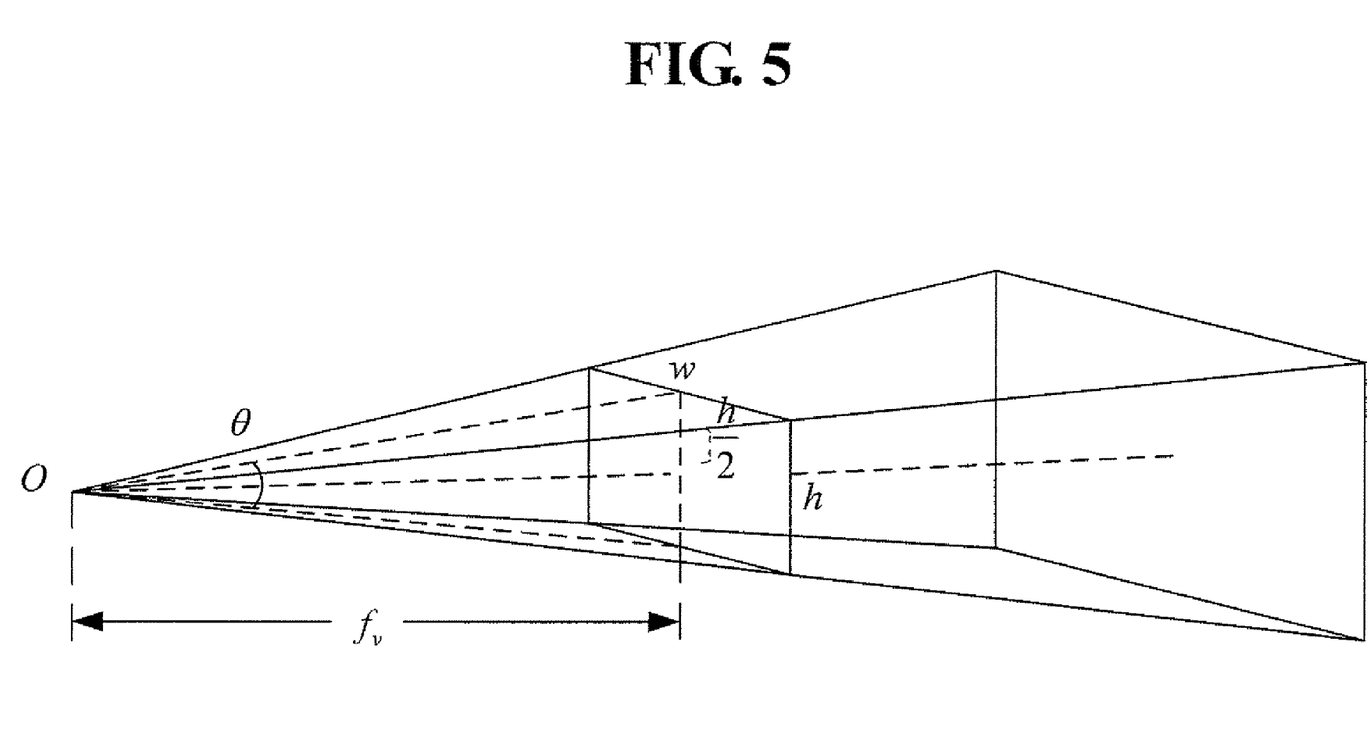
FIG. 5 illustrates the geometry of the pinhole camera with perspective projection.

First, the intrinsic parameters of the virtual camera will be calculated according to the parameters of the projection transformation of the VR software, the FOV angle θ and the image resolution. Referring to FIG. 5, the following equation of trigonometric function may be used to describe the relationship between the set projection transformation parameter and the intrinsic parameters of virtual camera.

[Equation 5]

$$\tan\left(\frac{\theta}{2}\right) = \frac{\frac{h}{2} * dy_v}{f_v} = \frac{h}{2\alpha_{vy}} \quad (5)$$

Where h is the height of image in the Y direction in virtual camera image plane and its unit is the number of pixels. The scale factors $\alpha_{vy}$ can be calculated according to the equation (5). The scale factor $\alpha_{vx}$ and $\alpha_{vy}$ in image X and Y axes are equal to each other, and the coordinate of the principal point $(u_{v0}, v_{v0})$ is the center of image, since the virtual camera is ideal pinhole camera. Then the intrinsic parameters matrix of the virtual camera is determined.

Figure 6:
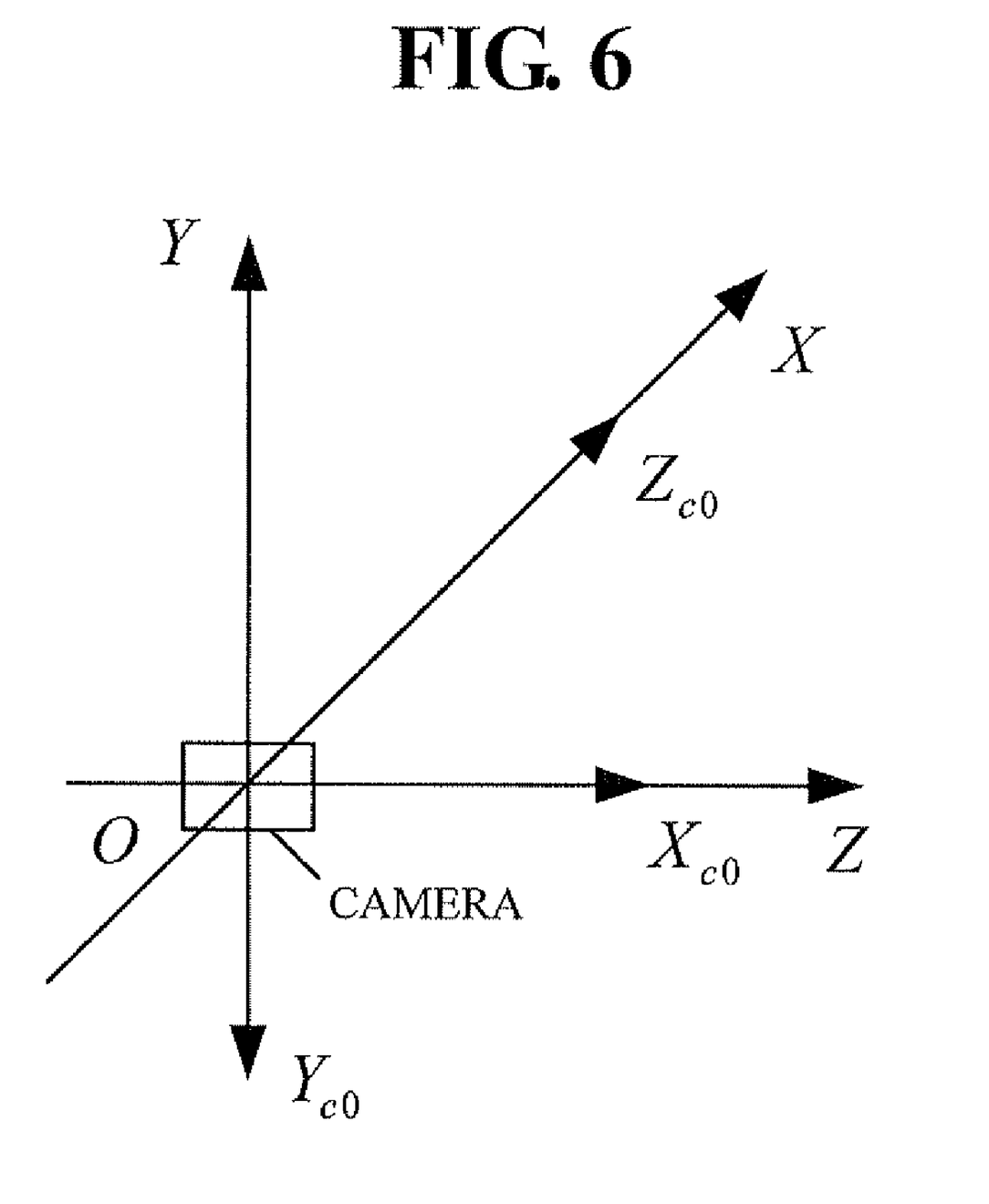
FIG. 6 illustrates an initial default state of a virtual camera, i.e. the initial default relationship between the virtual world coordinate system and the virtual camera coordinate system.

The extrinsic parameters of the virtual camera are calculated through the coordinate transformations. The extrinsic parameters $R_v$ and $T_v$ are relative to the parameters of the position of viewpoint and the yaw, pitch and roll angles $\theta_{Yaw}$, $\theta_{Pitch}$, $\theta_{Roll}$ used for model view projection of the VR software. The initial default state of the virtual camera coordinate system is illustrated in the FIG. 6. Referring to FIG. 6, the virtual world coordinate system is (X, Y, Z) and the virtual camera coordinate system is $(X_{c0}, Y_{c0}, Z_{c0})$. The viewpoint of the virtual camera is located at the origin of the world coordinate system, looking along the positive X-axis. So the rotation matrix from the world coordinate system to the initial default state of the virtual camera coordinate system $R_{v1}$ is determined as follows.

$$R_{v1} = \begin{bmatrix} 0 & 0 & 1 \\ 0 & -1 & 0 \\ 1 & 0 & 0 \end{bmatrix}$$

The virtual camera rotates in the order of roll, yaw and pitch from the initial default state with rotation matrix $R_{v2}$. Then the viewpoint moves from origin to the set position relative to the translation vector $T_v$ to achieve the transformation from the virtual world coordinate system to the virtual camera coordinate system. The rotation matrix $R_{v2}$ can be acquired according to the Euler equation as the following equation.

[Equation 6]

$$R_{v2} = \begin{bmatrix} \cos\beta\cos\gamma & \cos\beta\sin\gamma & -\sin\beta \\ \sin\alpha\sin\beta\cos\gamma - \cos\alpha\sin\gamma & \sin\alpha\sin\beta\sin\gamma - \cos\alpha\cos\gamma & \sin\alpha\cos\beta \\ \cos\alpha\sin\beta\cos\gamma + \sin\alpha\sin\gamma & \cos\alpha\sin\beta\sin\gamma + \sin\alpha\cos\gamma & \cos\alpha\cos\beta \end{bmatrix} \quad (6)$$

Where $\alpha=\theta_{Pitch}$, $\beta=\theta_{Yaw}$, $\gamma=\theta_{Roll}$. It can be obtained the rotation matrix $R_v = R_{v2} * R_{v1}$. On the assumption that the viewpoint coordinates in the world coordinate system is $T_{vW}$, the translation vector $T_v$ can be calculated by the following equation.

[Equation 7]

$$T_v = -(R_v * T_{vW}) \quad (7)$$

With the above solution procedure, the parameters of virtual camera are acquired. Subsequently, the parameters of the projector imaging model M2 and the actual camera model M3 will be acquired by using the following calibration method.

In the application of this simulation system, there is no need to estimate the projector imaging model M2 and the actual camera model M3 respectively, i.e. there is no need to determine the transformation from the projector image to the projection screen and the transformation from the projection screen to the camera image respectively. Only the determination of the transformation relationship between the projector image and the camera image is needed. So the projector imaging model and the actual camera model are regarded as a whole module for calibration. A nonlinear camera calibration technique is adopted because of the lens distortions of the camera 2.

Figure 7:
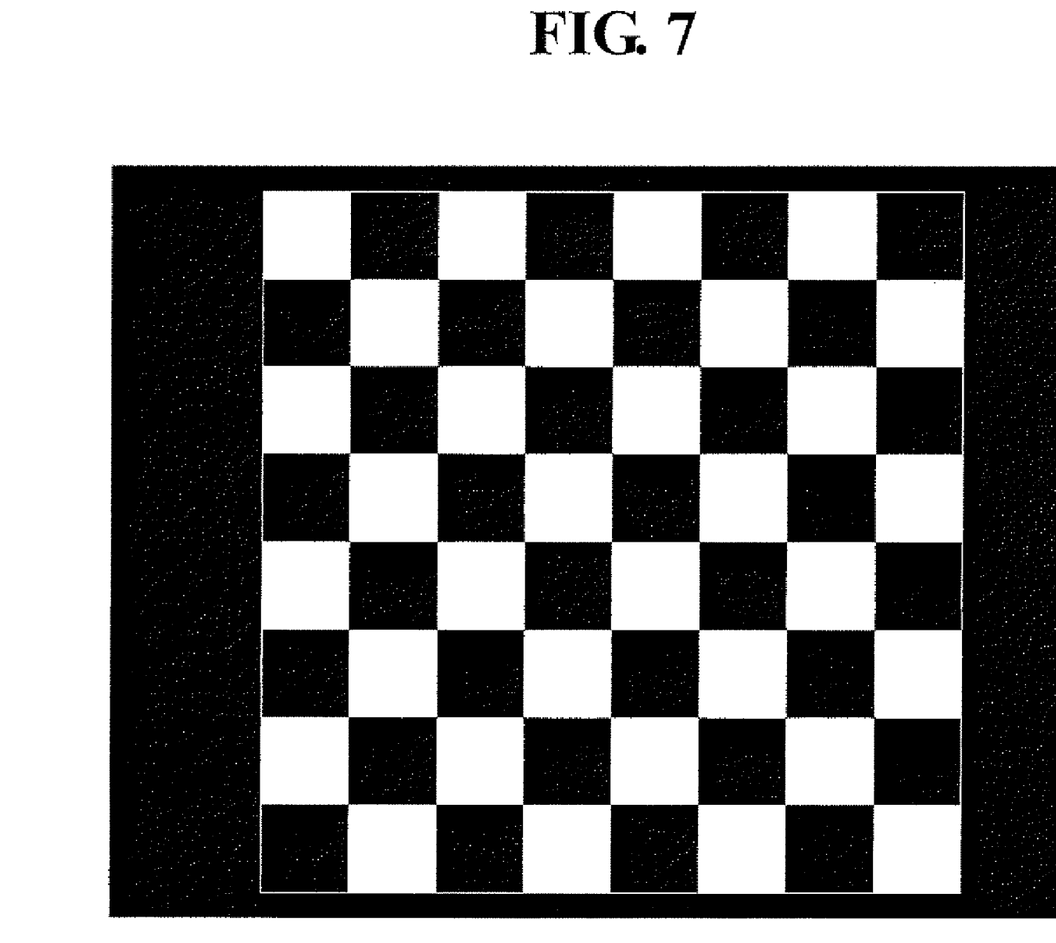
FIG. 7 illustrates a calibration pattern of an embodiment.

A calibration pattern is shown in FIG. 7. The image of a model plane contains a pattern of 4×4 squares, these corners are used for calibration. The calibration steps of the parameters are described as follows. First, the center of camera image is determined using a method of varying focal length presented by Lenz and Tsai (Lenz. R. K, Tsai. R. Y, Techniques for Calibration of the Scale Factor and Image Center for High Accuracy 3-D Machine Vision Metrology, IEEE Transactions on Pattern Analysis and Machine Intelligence. Volume 10. Issue 5. September 1988. Pages: 713-720). Then assuming the projector imaging model is a linear transformation, each four corresponding spatial collinear points on the planes of the projector computer image, the projection screen image and the camera coordinate system have the character of cross ratio invariability. The lens distortion calibration is achieved using the approach based on cross ratio invariability presented by Zhang Guangjun ("Machine Vision" 2005, written by Zhang Guangjun and published by Scientific Publishing Center, Beijing). Finally, based on the center of camera image and the lens distortion, the coordinate of the corner in calibration pattern in the camera coordinate system (X, Y) can be calculated according to the image coordinate in pixel ($u_c$, $v_c$). The transformation from camera image coordinate (X, Y) to the projector computer image coordinate ($u_p$, $v_p$) is linear, which is described by the following equation.

[Equation 8]

$$\begin{pmatrix} u_p \\ v_p \\ 1 \end{pmatrix} = H * \begin{pmatrix} X \\ Y \\ 1 \end{pmatrix} \quad (8)$$

Where H is a 3×3 matrix. Based on the corners coordinates of calibration pattern, linear equation groups are set up according to the equation (8). The linear transformation matrix H can be estimated using the least-squares method.

As described above in detail, all of parameters of hardware-in-the-loop simulation system are acquired. The output images of simulation system are regarded as the images of a camera of which the intrinsic and extrinsic parameters have been known according to the parameters of simulation system. So the correctness of the system may be confirmed and the performance of stereo vision algorithm such as feature extraction, stereo matching and 3D reconstruction based on the output images and parameters may be evaluated. The 3D reconstruction precision based on the hardware-in-the-loop simulation system can reach 1% according to the results of simulation experiments.

In view of the foregoing, it will be seen that advantageous results are obtained. The hardware-in-the-loop simulation system can be used not only for stereo vision but also in the field of computer vision for the hardware-in-the-loop simulation of camera imaging of virtual objects or scenes. Furthermore, the system described herein can be used in other fields for the hardware-in-the-loop simulation of camera imaging.

Although the details of the present invention have been described above with reference to a specific embodiment, it will be obvious to those skilled in the art that various changes and modifications may be made without departing from the scope and spirit of the invention.

It is intended that the following claims be interpreted to embrace all such variations and modifications.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A hardware-in-the-loop simulation system to verify computer vision, the system comprising:
   a virtual reality imaging unit that generates a virtual scene and an observed object using a virtual reality software, wherein virtual scene images of the scene at different viewpoints are obtained;
   a projector that projects the virtual scene images generated by the virtual reality software onto a screen; and
   a camera that shoots the virtual scene images projected by said projector on the screen, wherein the direction of the camera is controlled by a pan-tilt, wherein the camera is fixed on the pan-tilt, and wherein a position and orientation of the projector and the pan-tilt are fixed to the screen;

wherein the virtual reality imaging unit comprises a first computer and wherein said projector connects to the virtual reality imaging unit; and wherein the camera sends image data gathered while shooting the projected scene images to a second computer by a frame grabber board and the second computer is configured to control the pan-tilt to select a proper direction for the camera to shoot the virtual scene images projected onto the screen.

2. A hardware-in-the-loop simulation method for computer vision, the method comprising:

generating virtual objects or scenes with a first computer using virtual reality software installed on the first computer;

setting parameters for the virtual reality software to acquire an image of the virtual objects or scenes;

projecting the image onto a screen;

taking the image of the virtual objects or scenes on the screen using an actual camera to acquire a result of a simulation;

calculating parameters of a virtual camera with a second computer, and calibrating models for the actual camera and a projector for a high-accuracy parameter estimation with the second computer; and achieving computer vision experiments based on the result of the simulation with the second computer.

3. The hardware-in-the-loop simulation method according to claim 2, wherein the step of setting the parameters for the virtual reality software further comprise:

setting a vertical field of view angle in degrees, an aspect ratio of a width to height of a viewport, a distance from the viewpoint to near and far clipping planes, coordinates in a world coordinate system of the viewpoint, and yaw, pitch and roll angles.

4. The hardware-in-the-loop simulation method according to claim 2, wherein the step of calculating the parameters of the virtual camera is relative to the virtual reality software parameters; the intrinsic parameters of the virtual camera are calculated according to parameters of a projection transformation of the virtual reality software, and extrinsic parameters of the virtual camera are calculated according to parameters of a model view transformation of the virtual reality software.

5. The hardware-in-the-loop simulation method according to claim 2, wherein in the step of calibrating the actual camera and projector models, the projector model and the actual camera model are regarded as a whole module for calibration.

6. The hardware-in-the-loop simulation method according to claim 5, wherein a nonlinear camera calibration technique is used for high-accuracy parameter estimation of said whole module for calibration, comprising:

determining the center of a camera image using a method of varying focal length;

achieving lens distortion calibration using a calibration approach based on cross ratio invariability;

calculating a coordinate of a corner of a calibration pattern in a camera coordinate system based on the center of the camera image and the lens distortion, according to an image coordinate in pixel;

setting up linear equation groups according to a linear transformation model from the camera coordinate system to a projector computer image coordinate system; wherein a linear transformation matrix is estimated using a least-squares method to achieve the parameter estimation.

* * * * *